US006693478B1

(12) United States Patent
Teterud

(10) Patent No.: US 6,693,478 B1
(45) Date of Patent: Feb. 17, 2004

(54) SYSTEM AND METHOD FOR IMPLEMENTING SOFT POWER UP

(75) Inventor: Patrick Michael Teterud, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/215,422

(22) Filed: Aug. 9, 2002

(51) Int. Cl.[7] ................................................ H03K 3/00
(52) U.S. Cl. ...................................... 327/313; 361/91.1
(58) Field of Search ................................ 327/313, 326, 327/327, 379, 380, 381, 384, 483, 170, 575; 361/91.1, 91.3, 91.5, 93.9

(56) References Cited

U.S. PATENT DOCUMENTS

| | | | | |
|---|---|---|---|---|
| 4,542,399 A | * | 9/1985 | Monticelli | 327/483 |
| 4,922,129 A | * | 5/1990 | Wright | 327/575 |
| 4,952,863 A | * | 8/1990 | Sartwell et al. | 327/170 |
| 5,036,233 A | * | 7/1991 | Rothermel | 327/432 |
| 5,182,462 A | | 1/1993 | Wright | |
| 5,461,343 A | | 10/1995 | Foran | |
| 5,463,331 A | * | 10/1995 | Kuo | 327/170 |
| 5,541,553 A | * | 7/1996 | Chujo et al. | 327/483 |
| 5,585,712 A | | 12/1996 | Isham | |
| 5,627,738 A | | 5/1997 | Lubomirsky et al. | |
| 6,215,607 B1 | | 4/2001 | Ngo | |
| 6,246,533 B1 | | 6/2001 | Davis et al. | |
| 6,252,450 B1 | | 6/2001 | Patti et al. | |
| 6,271,978 B1 | | 8/2001 | Block et al. | |
| 6,285,223 B1 | | 9/2001 | Smith | |
| 6,297,921 B1 | | 10/2001 | Price, Jr. et al. | |
| 6,552,584 B2 | * | 4/2003 | Galli | 327/170 |

* cited by examiner

*Primary Examiner*—Terry D. Cunningham
(74) *Attorney, Agent, or Firm*—W. Daniel Swayze, Jr.; W. James Brady; Frederick J. Telecky, Jr.

(57) ABSTRACT

A system and method are disclosed to help protect a node of associated circuitry from overshooting or undershooting, such as can be associated with power up or other transitional modes. The protection is implemented by diode connecting a transistor, which has its base electrically coupled to the node during the transitional mode. Either after a predetermined time period or after the voltage at the node has reached a desired level, the diode connection can be removed to permit normal operation to begin in which a bias can be provided to the node.

4 Claims, 6 Drawing Sheets

SYSTEM AND METHOD FOR IMPLEMENTING SOFT POWER UP

TECHNICAL FIELD

The present invention relates generally to electrical circuits and, more particularly, to a system and methodology that mitigates overshoot during power up of an electrical circuit.

BACKGROUND OF THE INVENTION

Numerous types of electronic devices for a myriad of applications employ electrical circuits implemented as one or more integrated circuits (ICs). For example, ICs can be configured to achieve desired functions, such as, controlling associated devices and elements. For instance, ICs can be utilized to bias magneto resistive (MR) elements for reading and writing data to associated magnetic surface utilized in hard disc drives. However, it is often the case that at power up or during switching, currents or voltages supplied by ICs overshoot or spike above intended values.

By way of further illustration, various types of electronic circuitry, such as current mirrors, are commonly utilized in conjunction with ICs in biasing associated devices or performing current steering functions. A current mirror is fed by a current source, which can be a constant- or variable-current source. The current mirror provides an output current to associated parts of the IC based on the input current. In operation, overshoot tends to occur at a base node of the current mirror, which overshoot can be propagated through current mirrors to various parts of the IC. As a result, a current mirror often exposes sensitive associated circuitry to the risks of overshoot.

These unintended overshooting and undershooting conditions can have deleterious effects on the associated circuitry. The overshooting and undershooting tend to become more problematic with sensitive devices or components. For example, sensitive devices, including MR elements, can experience adverse coupling and/or recovery times if exposed to overshoot conditions, such as tend to occur at power up or fast recovery modes when biasing signals are applied initially.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to a system and method to mitigate overshoot in an IC, such as can occur at power up or activation of associated circuitry. When enabled, such as in response to application power (e.g., at power up), a protection system coupled to a node operates in a protection mode to facilitate a voltage at the node to rise to a desired level and then switches to a normal mode with little or no overshoot. In the normal mode a desired fixed voltage can be supplied to the node, for example. Because overshoot is substantially eliminated, such an approach provides for fast and safe recovery and is generally self-protecting.

A particular aspect of the present invention provides a transistor having a base coupled to the node. The transistor's base and collector are connected (e.g., diode connecting the transistor) for a period of time so as to mitigate overshoot at the node during start up (power up). The diode connection can be implemented for a predetermined time period or for a time period based on the voltage at the node. The diode connection is then removed and a desired voltage can be safely supplied to the node for normal operation of the associated IC.

Another aspect of the present invention provides a method for protecting a node of associated circuitry from fluctuations; such as tend to occur at power up. The method includes enabling protection of the node, such as in response to application of power to an associated IC. The protection can be implemented, for example, by diode connecting a transistor having its base coupled to the node where protection is desired. After the node reaches the approximate desired ending voltage, the protection is disabled (e.g., removing the diode connection from the transistor) and the node can be connected to the desired ending voltage, such as provided by an associated power supply.

The following description and the annexed drawings set forth certain illustrative aspects of the invention. These aspects are indicative, however, of a few ways in which the principles of the invention may be employed. Other advantages and novel features of the invention will become apparent from the following detailed description of the invention when considered in conjunction with the drawings.

DETAILED DESCRIPTION OF THE INVENTION

The present invention relates generally to a system and method to help protect a node of associated circuitry from sharp fluctuations that tend to be associated with power up or other transitional modes. The protection is implemented by diode connecting a transistor, which has its base electrically coupled to the node during the transitional mode. Either after a predetermined time period or after the voltage at the node has reached a desired level, the diode connection can be removed and normal operation can begin.

Figure 1:
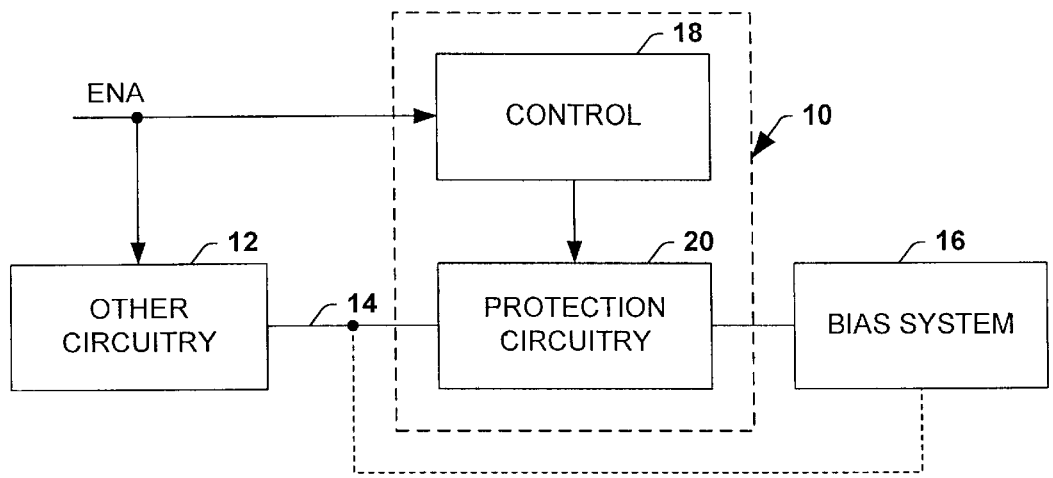
FIG. 1 is a block diagram illustrating a soft power up system according to an aspect of the present invention.

FIG. 1 depicts a block diagram of a soft power up system 10 in accordance with an aspect of the present invention. The soft power up system 10 is electrically associated with other circuitry 12 having a node 14. For example, the node 14 corresponds to a juncture within the circuitry 12 that is sensitive to sharp fluctuations in current and/or voltage, such as may occur at power up. A biasing system 16, such as a current source or other source of electrical energy, is connected to bias the other circuitry 12 with a desired bias (e.g., current or voltage) through the node 14. The soft power up system 10 is connected between the circuitry 12 and the biasing system 16 to mitigate overshoot at the node 14, such as at power up or fast recovery modes, according to an aspect of the present invention. In this way, the desired bias can be provided to the associated circuitry 12 in a substantially safe and effective manner with little or no overshoot. For example, the power up system 10 and other circuitry 12 receive an enable signal (ENA) that activates such systems.

For example, the other circuitry 12 can include a current mirror such as operative to supply a desired amount of current to one or more parts other associated circuitry based on the bias from the biasing system 16. In one particular example, the current mirror may be utilized to bias a magneto resistive (MR) head, such as may form part of a hard disk drive. The MR head is sensitive to overshooting that tends to occur during power up of the respective current mirror. Advantageously the soft power up system 10 operates to mitigate current and voltage at the node 14 from overshooting or undershooting.

The soft power up system 10 includes a control block 18 that receives the enable signal (ENA), such as can indicate if power is being supplied. The control block 18 is coupled to protection circuitry 20, which is operative to mitigate undesired overshoot at the node 14 based on the control provided by the control block 18. That is, during power up the control block 18 controls the protection circuitry 20 to operate in a protection mode to mitigate overshoot at the node 14.

By way of further example, the protection circuitry 20 is connected to the node 14 and to a transistor having a base electrically coupled to the node 14. The control block 18 operates to diode connect such transistor (e.g., by shorting its base and collector) in response to the enable signal indicating a power up condition. Because the transistor is diode connected during power up, for example, overshoot that tends to occur at the node 14 due to the biasing from the biasing system 16 during power up can be substantially prevented. Additionally, once a desired a voltage has been reached at the node 14, the control block 18 can cause the protection circuitry 20 to operate in a normal mode in which the diode connection can be removed. Additionally, as the voltage at the node 14 reaches its desired level, the protection circuitry 20 can electrically connect the node to a voltage source to provide a desired voltage at the node. The connection of the node 14 to the desired voltage can occur concurrently with the removal of the diode connection.

Figure 2:
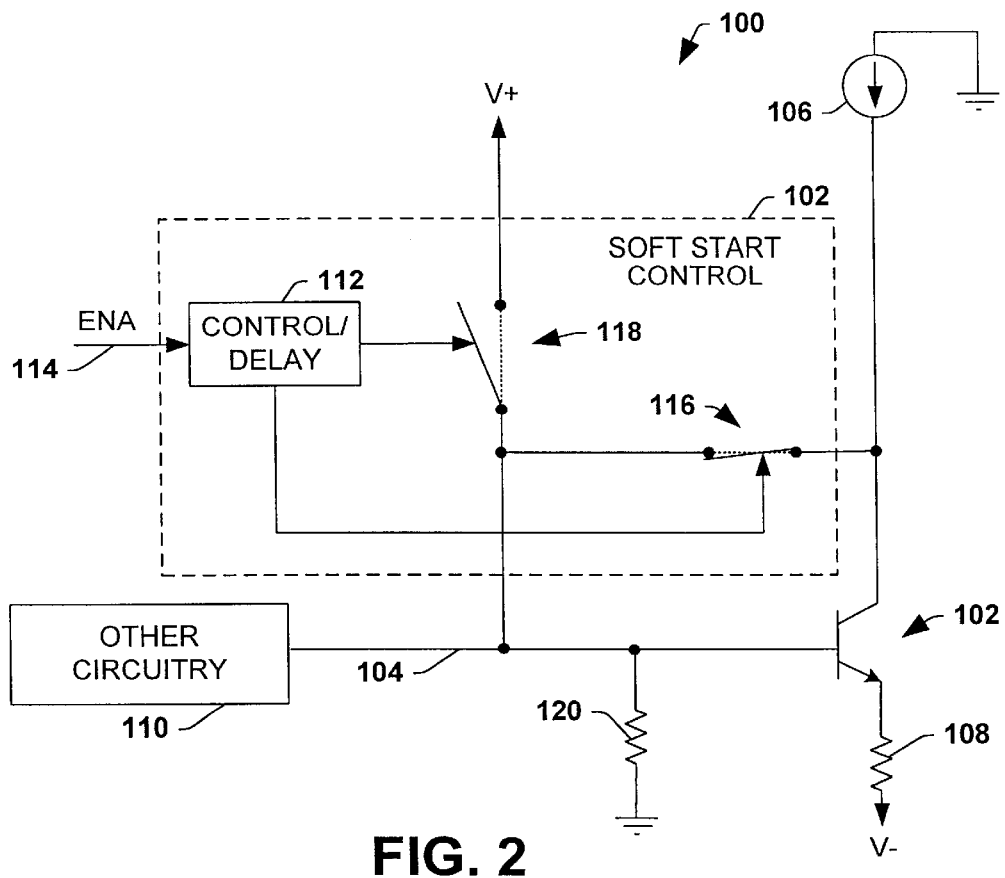
FIG. 2 illustrates an example of part of an integrated circuit (IC) including a soft power up system in accordance with an aspect of the present invention.

FIG. 2 illustrates an example implementation of an example of a soft power up system 100 in accordance with an aspect of the present invention. The system 100 is coupled to a biasing system that includes a transistor 102 having a base coupled to a node 104. The transistor 102 also is coupled between the current source 106 and a negative voltage supply indicated at the V− (e.g., its collector is coupled to the current source 106). In the example of FIG. 2, the transistor 102 is illustrated as an NPN transistor having its base coupled to the node 104 and its emitter coupled to V− through a resistor 108. Its collector receives a bias current from a current source 106. The current source 106 is configured to electrically bias other circuitry 110 through the node 104.

The node 104, for example, corresponds to an electrical juncture of the associated circuitry 110 that supplies voltage or current (directly or indirectly) to an associated device (not shown) based on the bias current from the current source 106. The device, for example, corresponds to an important component or system that is sensitive to large fluctuations, which can occur at power up or during fast recovery modes.

The system 100 also includes a control/delay block 112 that receives an enable signal (ENA) 114, which, for example, indicates when a power up or other transitional mode begins. The control/delay block 112 is operative to control a switch 116 coupled between the collector and base of the transistor 102. Another switch 118 is electrically coupled between the node 104 and a positive voltage indicated at V+. The control/delay block 112 also is operative to control the switch 118.

By way of illustration, the control/delay block 112 closes the switch 116 in response to receiving the enable signal 114, such as indicating a power up condition (or fast recovery) has begun. By closing the switch 116, the transistor 102 becomes diode connected and provides an overshoot protection mode according to an aspect of the present invention. With the transistor 102 diode connected, at least a portion of the current supplied by the current source 106 is provided through the switch 116 and a resistor 120 coupled between the node 104 at the base of the transistor 102 and ground.

For example, the resistor 120 has a resistance that is about equal to or greater than 25 K$\Omega$, although other resistances could be used. Accordingly, during this initial operating mode the voltage at the base of the transistor 102 (at node 104) rises nicely and does not overshoot, in contrast to conventional systems. In particular, as the voltage at node 104 increases, more current is conducted through the transistor 102 and, due to the diode connection of such transistor, the base of the transistor 102 does not overshoot. At some time delay later, the control/delay block 112 turns the switch 116 off and turns the switch 118 on (e.g., the control/delay block controls the switches 116 and 118 to operate generally mutually exclusively) to enter a normal operating mode. The control/delay block 112 can coordinate the transition from the protection mode to the normal mode to coincide with the voltage at the node 104 reaching a desired voltage level, such as V+. Thus, by directly connecting the node 104 to the desired voltage potential V+ after bringing up the voltage at the node during the protection mode, a smooth transition can be provided at power up which mitigates potential overshoot that might otherwise occur at the node 104.

Figure 3:
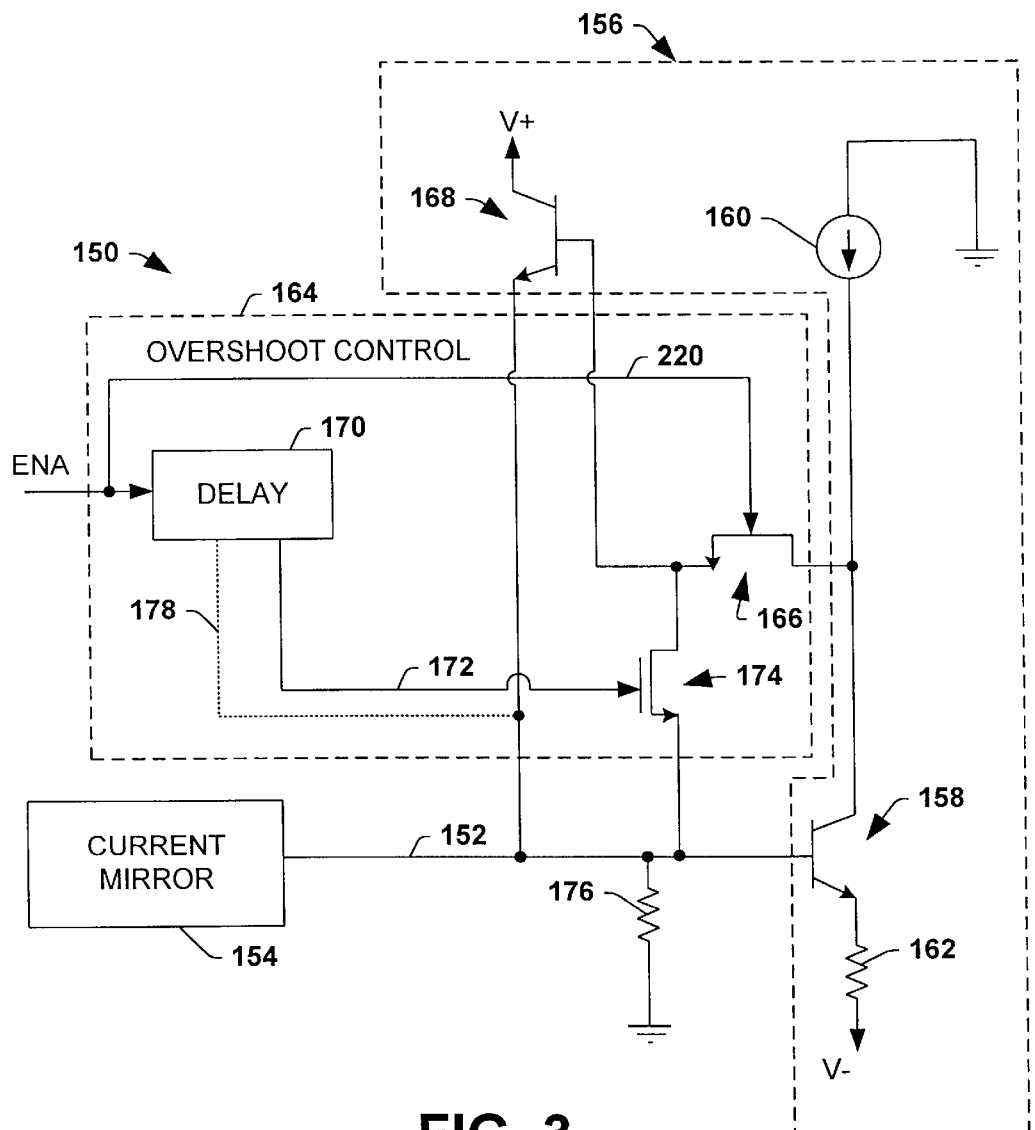
FIG. 3 illustrates an example of part of an IC including a soft power up system implemented according to an aspect of the present invention

FIG. 3 illustrates another example of a soft start system 150 that could be implemented in accordance with an aspect of the present invention. In this example, the soft start system 150 is coupled to a node 152 associated with a current mirror system 154 that is biased based on a bias current provided from a bias system 156. It is to be understood and appreciated, however, that the soft start system 150 could be utilized in connection with other types of systems having one or more nodes associated with components or devices that are sensitive to large fluctuations that tend to occur at such node during power up or other transitional conditions (e.g., switching conditions, surge conditions, and so forth).

The biasing system 156 includes an NPN transistor 158 having a base coupled to the node 152. A current source 160 provides bias current to the collector of the transistor 158. The emitter of the transistor 158 is coupled to a negative potential, indicated at V−, through a resistor 162. The bias current is utilized to bias the current mirror system 154. The biasing system 156 also includes another NPN transistor 168 that is coupled between a positive voltage supply, indicated at V+, and the node 152. The transistor 168 is used for base current cancellation in a normal operating mode of the system 150. Those skilled in the art will understand and appreciate other arrangements and configurations that could be employed to bias the current mirror.

The soft start system 150 includes overshoot control system 164 that implements overshoot control, such as based on an enable signal, indicated at ENA. In particular, the enable signal ENA is provided to a gate of a field effect transistor (FET) 166, which activates the FET to an on condition. The FET 166 is coupled between the collector of the transistor 152 and a base the transistor 168.

The overshoot control 164 also includes a delay block 170 that also receives the enable signal ENA. The delay block 170 provides a control signal 172 to a gate of another FET 174. The FET 174 is coupled between the node 152 and the base of the transistor 168. The FETs 166 and 174 thus are connected in series between the base and collector of the transistor 158. At power up, the delay block 170 provides the control signal 172 to turn on the FET 174. Accordingly, at power up (e.g., during a power up mode) both FETs 166 and 174 are initially on, thereby diode connecting the transistor 158. Because the transistor 158 is diode connected for a period of time (e.g., as controlled by the delay block) the voltage at node 152 can rise in a desired manner without overshoot.

For example, current flows through a resistor 176 coupled between the node 152 and ground. Subsequently, the delay block 170 provides the control signal 172 to turn off the FET 174. The delay block 170 may implement this control, for example, based on an elapsed predetermined time period or based on the voltage at the node 152. For example, the delay block 170 can sense the voltage at the node 152, as indicated by dotted line 178. When the FET 172 is turned off, the transistor 158 is no longer diode connected and the transistor 168 turns on. When the transistor 168 turns on, the base emitter voltage $V_{BE}$ for the transistor 168 will generally be provided across the collector and base of the transistor 158. In addition, with the transistor 168 turned on, it supplies current to the node 152 according to activation of the transistor 168. It will be appreciated that the mode change from turning off the FET 174 to turning on the transistor 168 can provide a smooth transition at the node 152 without overshoot.

Additionally, or alternatively, the delay block 170 can operate to turn off the FET 174 at any time after the voltage of the node 152 reaches a desired level. When the delay block 160 turns off the FET 174, the transistor 168 turns on. This transition occurs because the voltage at the collector of the transistor 158 is provided at the base of the transistor 168 through the FET 166. It is to be appreciated that the transistor 168 operates as a base current cancellation device (or a bipolar device) for the node 152, such that the base emitter voltage across the transistor 168 corresponds to the voltage across the collector and base of the transistor 158.

Figure 4:
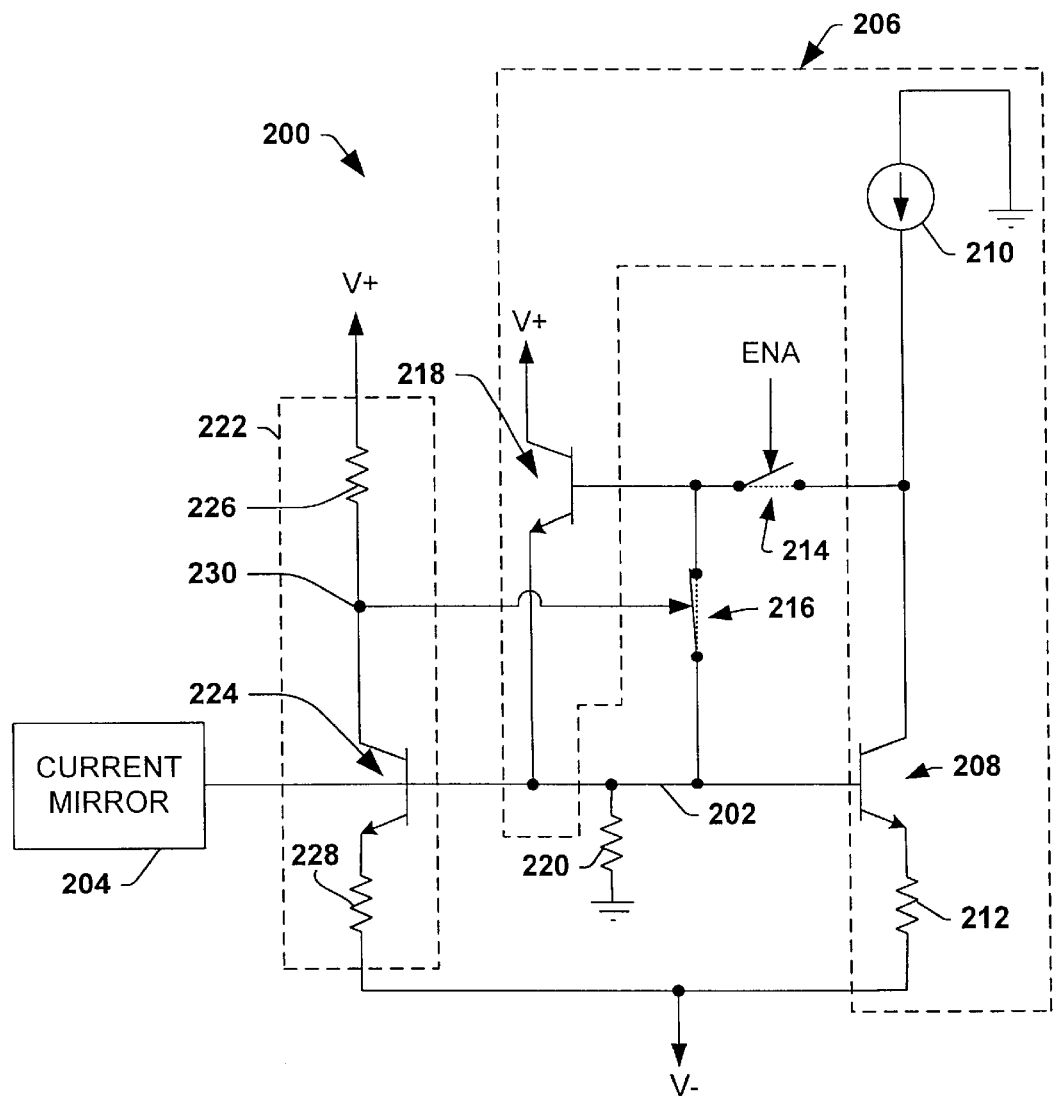
FIG. 4 illustrates an,example of part of an IC including a soft power up system and associated delay circuitry in accordance with an aspect of the present invention.

FIG. 4 illustrates an example of another circuit 200 that can be utilized to implement a soft power up at a node 202 in accordance with an aspect of the present invention. The node 202 defines a juncture of an associated circuit 204 that is biased by a biasing system 206. The associated circuit 204 is coupled to bias an associated device or component that is sensitive to large fluctuations based on the bias from the biasing system 206.

The biasing system 206 includes a transistor 208 (e.g., an NPN transistor) having a base coupled to the node 202. The transistor 208 is connected between a current source 210 that provides a bias current and a resistor 212. The resistor 212 is coupled between the emitter of the transistor 208 and a voltage potential indicated at V−. A pair of switches 214 and 216 is connected in series between the collector and base of the transistor 208. A juncture between these switches 214 and 216 is connected to a base of a transistor 218, which also forms part of the biasing system 206. The transistor 218 is connected between a positive voltage indicated at V+ and the node 202. A resistor 220 also is connected between the node 202 and ground. An enable signal, such as from associated circuitry to indicate a power on condition, is provided to control the switch 214. Thus, when the enable signal is provided, the switch 214 is closed.

An overshoot control system 222 provides a signal to control the switch 216 in accordance with an aspect of the present invention. In this particular example, the overshoot control system 222 includes a transistor 224 connected in series with a pair of resistors 226 and 228 between a positive voltage V+ and the negative voltage V−. The control signal for the switch 216 corresponds to a voltage at a node 230 between the resistor 226 and the transistor 224. It is to be understood and appreciated that, in this arrangement, the voltage potential V+ and V− are simply relative voltages in which the voltage V+ is greater than V−.

By way of illustration, when the circuit is activated, the control voltage provided at the node 230 initially is at about V+ because the transistor 224 is off. Additionally, as mentioned above, when the circuit 200 is enabled, the switch 214 closes in response to receiving the enable signal ENA. By closing the switches 214 and 216 during power up, the transistor 208 becomes diode connected, which corresponds to an overshoot protection mode. With the transistor 208 diode connected, the voltage at the node 202 can rise in a desired manner (e.g., with little or no overshoot)

As the voltage at the node 202 changes to its desired level, the transistor 224 will eventually be biased on so that current conducts across the resistor 226. This current causes a voltage drop across the resistor 226 and, in turn, a corresponding decrease in the control signal at the node 230 that biases the switch 216. The decrease in voltage at 230 eventually causes the switch 216 to turn off. When the switch 216 turns off, the transistor 218 is biased to an on condition, such as due to its base-emitter voltage exceeding an associated threshold. That is, the base-emitter voltage of the transistor 218 corresponds to the collector-base voltage of the transistor 208. When the transistor 218 turns on, the node 202 is coupled to the desired voltage potential, with the transistor 218 supplying current to the node based on the collector-base voltage of the transistor 208. Thus, it will be appreciated that the voltage at the node 202 rises in a desired manner (e.g., without overshoot) providing a smooth transition to the desired voltage at power up.

Figure 5:
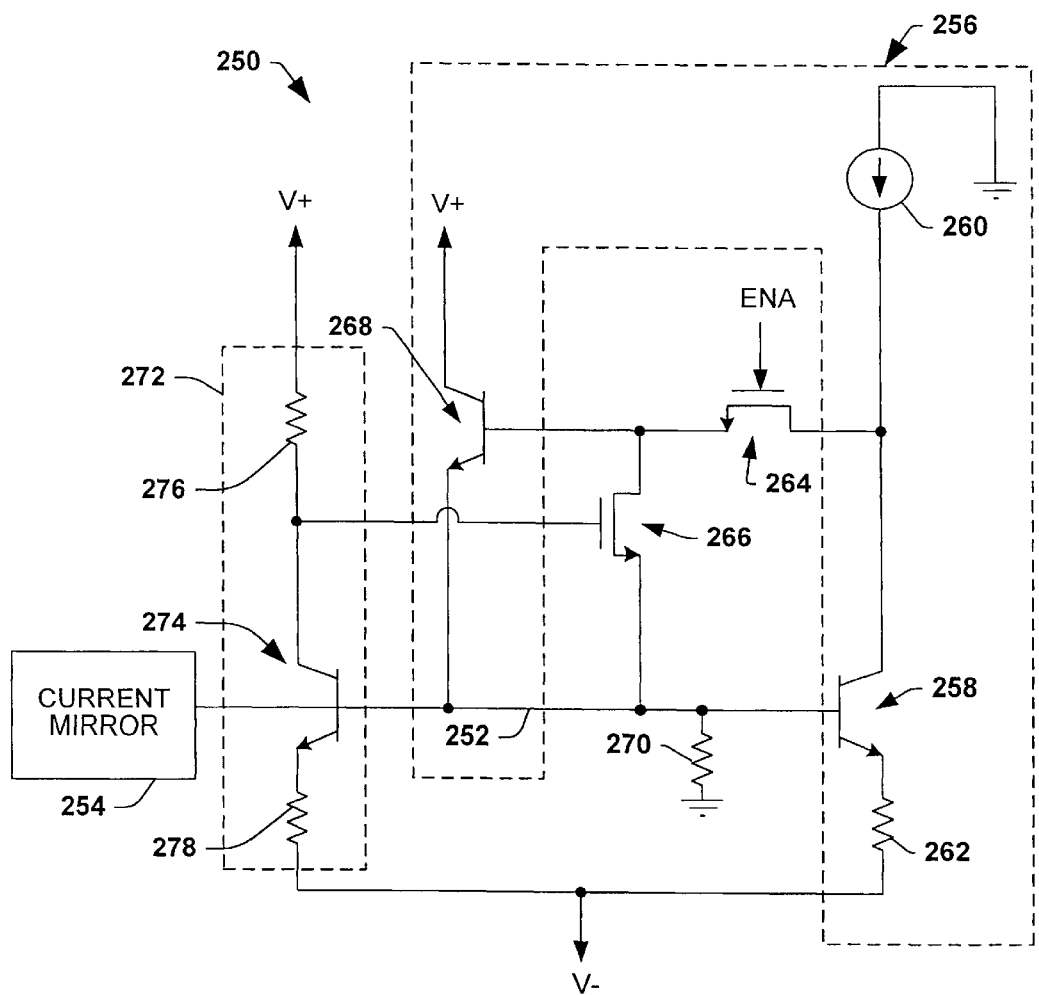
FIG. 5 illustrates an example of soft power up circuitry associated with a current mirror in accordance with an aspect of the present invention

FIG. 5 depicts an example of soft power up circuitry 250 implemented in accordance with an aspect of the present invention. The circuitry 250 is similar to that shown and described above with respect to FIG. 4. Briefly stated, the circuitry 250 is coupled to mitigate overshoot at a base node 252 of an associated current mirror system 254 that is biased by a biasing system 256. The biasing system 256 includes a transistor 258 having a base coupled to the node 252. The transistor 258 also is connected between a current source 260 that provides a predetermined bias current and a resistor 262. A pair of FETs 264 and 266 are connected in series between the collector and base of the transistor 258. The base of another NPN transistor 268 (also part of the biasing system 256) is connected to a juncture between the FETs 264 and 266. The transistor 268 is connected to provide a desired voltage V+ at the node 252 when the transistor is activated. A resistor 270 also is connected between the node 252 and ground.

A control system 272 is coupled to control operation of the FET 266 during power up in accordance with an aspect of the present invention. In particular, the system 272 includes a transistor 274 having a base coupled to the node 252 and a collector coupled to the gate of the FET 266. The collector of the transistor 274 is coupled to V+ through a resistor 276 and to V− through another resistor 278. The transistor 274 thus operates based on the voltage at the node 252. The control voltage provided to the gate of the FET 266 also varies based on the voltage at the node 252. For example, the transistor 274 is biased to an on condition as the voltage at the node 252 increases, which condition causes a corresponding decrease in the voltage at the gate of the FET 266.

For example, at power up, an enable signal ENA activates the circuitry 250, so that the FET 264 is turned on. The other FET 266 also is activated at power up because the transistor 274 is off due to the initial low voltage at the node 252. The voltage at the node 252 rises in a desired manner and, in turn, biases the transistor 274 on, which results in the gate voltage of the FET 266 decreasing and eventually turning the FET off. When the FET 266 turns off, the transistor 268 turns on so as to couple V+ to the node so that normal operation of the associated circuitry can begin, with the base node 252 of the current mirror being biased by the transistor 268 based on the current from the current source 260. Advantageously, this arrangement provides a smooth transition to the desired voltage V+ at the node 252 without overshoot so that sensitive circuitry coupled to (or at least responsive to the voltage at) the node will not be adversely affected.

Figure 6:
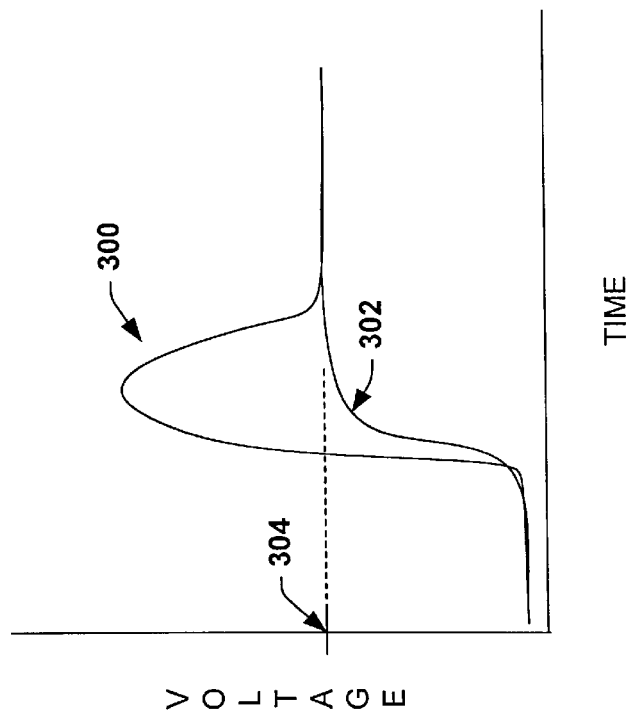
FIG. 6 is a graph in which voltage is plotted versus time, illustrating signal response of a conventional approach relative to an approach according to an aspect of the present invention.

FIG. 6 illustrates a graph of voltage verses time, such as for a sensitive node of an associated circuit. In particular, the graph includes an example plot 300 of a voltage response at power up for a conventional system and an example plot 302 of a voltage response at power up for a system implementing a soft power up to protect the node from overshooting or undershooting according to an aspect of the present invention. The plot 300 includes significant overshoot prior to stabilizing at a desired voltage, indicated at 304. It is to be understood and appreciated that overshoot, such as occurs in most conventional systems, can cause deleterious effects in sensitive circuitry. In contrast, by having the sensitive node associated with a soft power up system implemented according to an aspect of the present invention, such overshoot is mitigated during power up as indicated at 302.

Figure 7:
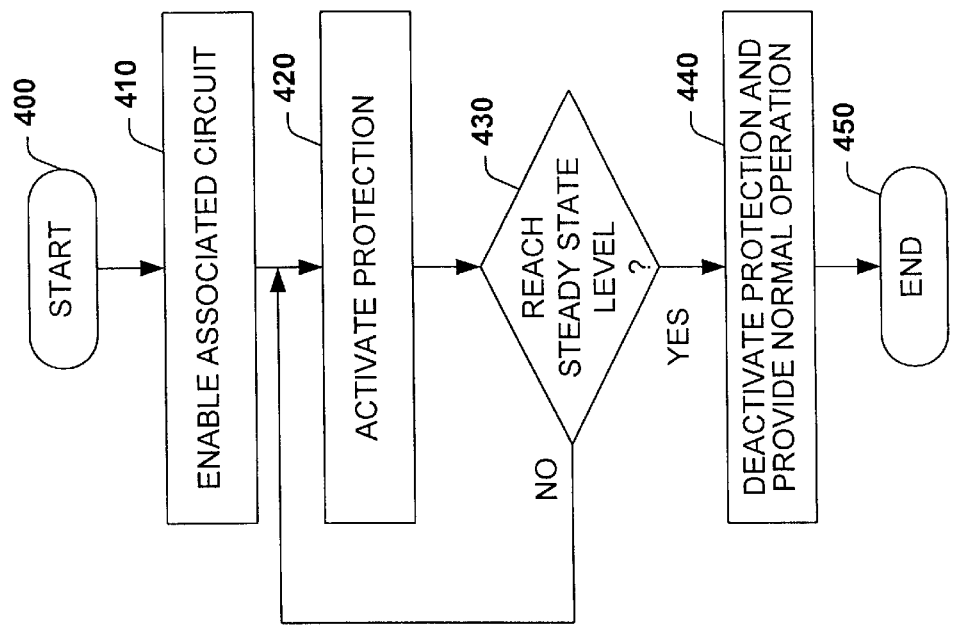
FIG. 7 is a flow diagram illustrating a basic methodology for implementing a soft power up according to an aspect of the present invention.
Figure 8:
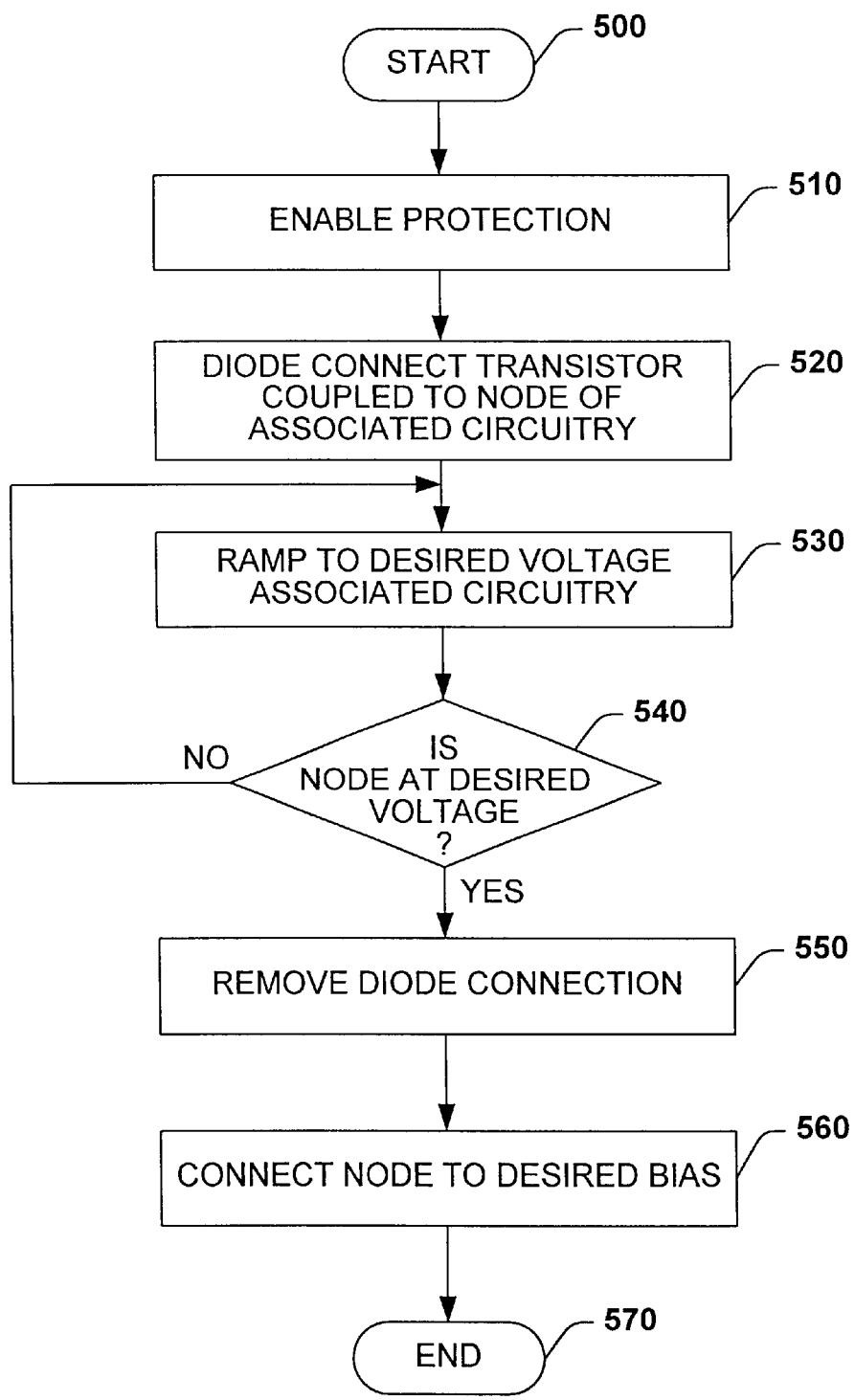
FIG. 8 is a flow diagram illustrating another methodology for implementing a soft power up according to an aspect of the present invention.

In view of the circuitry and functional examples shown and described above, methodologies that may be implemented in accordance with the present invention will be better appreciated with reference to the flow charts of FIGS. 7 and 8. While, for purposes of simplicity of explanation, the methodologies are shown and described as a executing serially, it is to be understood and appreciated that the present invention is not limited by the order shown, as some aspects may, in accordance with the present invention, occur in different orders and/or concurrently from that shown and described herein. Moreover, not all features may be required to implement a methodology in accordance with the present invention. It is further to be appreciated that the methodologies or one or more aspects thereof could be implemented as hardware, software, or as a combination of hardware and software.

FIG. 7 illustrates a flow diagram for implementing a soft power up methodology in accordance with an aspect of the present invention. The methodology begins at 400, such as in conjunction with powering up associated circuitry in an IC. At 410, the associated circuitry is enabled, such as by providing an enable signal to activate desired circuit components in the IC. In response to the enable signal, the soft power up protection is activated at 420 so as to mitigate overshoot that might occur during power up. For example, the overshoot protection can be implemented relative to a node that is connected to receive a bias (e.g., voltage or current), such as is used to bias associated circuitry that is sensitive to large fluctuations that tend to occur at power up. The bias can be used to bias a current mirror, for example. In a particular aspect of the present invention, the base node could be coupled to a base of an NPN transistor, which is diode connected to provide desired overshoot protection during a soft power up mode.

At 430, a determination is made as to whether the desired steady state level has been reached. If the steady state level has not been reached or a sufficient delay has not been implemented, the methodology returns to 420 in which the soft power up protection (e.g., diode connecting the transistor) is maintained. Once a sufficient steady state level at the node has been achieved, the methodology proceeds to 440. It will be appreciated that as an alternative, the determination at 430 can be implemented as a delay for predetermined time period sufficient to allow the voltage at the node to rise to its desired level.

At 440, the overshoot protection is deactivated and a normal operating mode can begin. Normal operation can include coupling the node to a desired voltage, which can be fixed or variable depending on its application. From 440, the methodology ends at 450.

FIG. 8 is a flow diagram illustrating another methodology for mitigating overshoot (or undershoot) in accordance with an aspect of the present invention. The methodology begins at 500, such as in conjunction with providing power to an IC implementing functional circuitry as well as protection circuitry according to an aspect of the present invention. The functional circuitry, for example, includes a current mirror network that is biased from a bias system with current through a base node, which is also coupled to the protection circuitry. In one aspect, the current system includes an NPN transistor having its base coupled to the base node of the current mirror.

During an initial part of the power up process, at 510, the protection circuitry is enabled, such as based on an enable signal from a control system. Then at 520, the transistor of bias system, which is coupled to the sensitive node of the functional circuitry, is diode connected. By diode connecting the transistor, overshoot is mitigated at the node so that the voltage at the node ramps (e.g., ramps up or down) to a desired voltage level at 530.

At 540, a determination is made as to whether the node has reached the desired voltage. The determination at 540, for example, can be implemented by employing a delay system having a delay transistor with its base also coupled to the node. As the voltage at the base rises, the delay transistor turns on and conducts current through a resistor. The voltage drop across the resistor can be electrically coupled to control the diode connection (520), such as coupled to a gate of an associated FET or other transistor or switch device that forms part of the diode connection path.

If the determination is negative, the methodology returns to 530 in which the voltage at the node continues to ramp to the desired voltage. If the determination at 530 is positive, indicating that the desired voltage has been reached at the node, the methodology proceeds to 550. At 550, the diode connection is removed. Next, at 560, the node is connected to a desired bias, such as provided by a transistor coupled to a fixed supply and controlled based on the bias current. It is to be appreciated that the removal of the diode connection (550) and the connection to the desired bias (560) can occur substantially concurrently. It further will be appreciated that the transition from the starting voltage to the ending desired voltage at the node occurs smoothly and without overshoot. As a result, the components and devices that are associated with (e.g., biased or powered) by the other circuitry that includes the node are not adversely affected by overshoot that otherwise tends to occur in conventional systems. From 560, the methodology ends at 570 and normal operation of the circuitry can begin.

What has been described above includes examples and implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for mitigating overshoot at a node of an associated circuit, the associated circuit receiving a bias at the node via a transistor having a base coupled to the node, the system comprising:
   at least one switch coupled between the base and a collector of the transistor, the at least one switch being controlled to connect the base and the collector for a time period so as to mitigate overshoot at the node as a voltage at the node changes from a starting voltage to a desired voltage;
   a switch device coupled between the node and a desired bias, the switch device associated with the at least one switch such that the switch device is activated in response to deactivation of the at least one switch;
   the transistor defining a first transistor, the switch device further comprising a second transistor having a base coupled to a juncture between the at least one switch and the collector of the first transistor;
   a control system operative to control operation of the at least one switch during power up of the associated circuit; and
   a third transistor having a base coupled to the node and operating based on the voltage at the node, such that, as the voltage at the node increases, the third transistor activates to cause a decrease in a control voltage that is applied to control the at least one switch, the decrease in the control voltage causing the at least one switch to disconnect the collector and the base of the first transistor.

2. The system of claim 1, further comprising a delay element operative to cause the at least one switch to connect the collector and the base of the transistor for the time period.

3. A system to mitigate fluctuations at a node of an associated circuit, the system comprising:
   a first transistor having a base coupled to the node and a collector operative to receive a bias current from an a current source;
   at least a second transistor coupled between the base and a collector of the first transistor, the second transistor being controlled to connect the base and the collector of the first transistor so as to mitigate overshoot at the node as a voltage at the node chances to from a starting voltage to a desired ending voltage;
   a third transistor coupled between the node and a voltage supply, the third transistor being activated to provide a desired bias to the node in conjunction with the second transistor disconnecting the base and the collector of the first transistor;
   a control system coupled to control the second transistor; and
   a fourth transistor having a base coupled to the node and operating based on the voltage at the node, such that, as the voltage at the node increases, the fourth transistor activates to cause a decrease in a control voltage that is applied to control the second transistor, the decrease in the control voltage causing the second transistor to disconnect the collector and the base of the first transistor.

4. The system of claim 3, the control system further comprising a resistor coupled between a voltage supply and a collector of the fourth transistor, a juncture between the resistor and the fourth transistor being coupled to control the second transistor as a function of the voltage at the node.

* * * * *